United States Patent
Martinez et al.

(10) Patent No.: US 9,650,754 B2
(45) Date of Patent: May 16, 2017

(54) AUTOMATIC POSITION LOCKING MECHANISM FOR LOADER ASSEMBLY PARKING STANDS

(71) Applicant: Deere & Company, Moline, IL (US)

(72) Inventors: Ignacio Alonso Martinez, Saltillo (MX); Jose Rene Liñan, Ramos Arizpe (MX); Damien Faivre, Apremont (FR)

(73) Assignee: Deere & Company, Moline, IL (US)

( * ) Notice: Subject to any disclaimer, the term of this patent is extended or adjusted under 35 U.S.C. 154(b) by 54 days.

(21) Appl. No.: 14/724,766

(22) Filed: May 28, 2015

(65) Prior Publication Data
US 2016/0348334 A1    Dec. 1, 2016

(51) Int. Cl.
*E02F 3/627*    (2006.01)
*E02F 3/36*    (2006.01)
*F16M 11/38*    (2006.01)

(52) U.S. Cl.
CPC .......... *E02F 3/3627* (2013.01); *E02F 3/6273* (2013.01); *F16M 11/38* (2013.01); *F16M 2200/024* (2013.01)

(58) Field of Classification Search
CPC ................................ E02F 3/627; E02F 3/6273
USPC ................... 414/685, 686; 172/247; 248/243
See application file for complete search history.

(56) References Cited

U.S. PATENT DOCUMENTS

| | | | |
|---|---|---|---|
| 4,751,540 A * | 6/1988 | Jones | F16M 11/00 248/168 |
| 2010/0095563 A1* | 4/2010 | Webb | E02F 3/34 37/444 |

FOREIGN PATENT DOCUMENTS

| | | |
|---|---|---|
| DE | 1193876 B | 5/1965 |
| DE | 102005053041 A1 | 5/2007 |
| EP | 1339656 A1 | 2/2004 |
| JP | 2008240344 A | 10/2008 |

OTHER PUBLICATIONS

European Patent Office, European Search Report for Application No. 16171145.2-1712, Oct. 5, 2016.

* cited by examiner

*Primary Examiner* — Gerald McClain
*Assistant Examiner* — Ronald Jarrett
(74) *Attorney, Agent, or Firm* — Lorenz & Kopf, LLP

(57) ABSTRACT

A parking stand for a detachable front loader assembly including a support leg pivoted to a boom, which is able to pivot between an extended and a retracted position. A set of parallel struts engage a locking plate, which is attached to the support leg. Being engaged within locking mechanism divots, the support leg is secured within an optimally extended position. Extending the parking stand support leg into a parking configuration is achieved by way of a series of semi-automated actions that are triggered and propelled by way of hydraulic movement of a loader's boom and bucket. Such semi-automated actions include unlocking, extending, and securing the support leg. Retraction of the support leg is similarly executed.

11 Claims, 4 Drawing Sheets

AUTOMATIC POSITION LOCKING MECHANISM FOR LOADER ASSEMBLY PARKING STANDS

TECHNICAL FIELD

A parking stand for supporting a boom-type loader assembly, which is commonly mounted onto tractors such as front loaders. More particularly, the parking stand includes a locking mechanism to facilitate semi-automated parking stand positioning.

BACKGROUND

Used in the context of heavy equipment, a "loader" is a type of tractor having a front-mounted rectangular wide bucket connected to the end of two hydraulic booms. A loader, may also be referred to as a bucket loader, front loader, front-end loader, payloader, scoop, shovel, skip loader, or wheel loader. It is most often a wheeled vehicle, although loaders moving about tracks are often used where the geography is not suitable for wheels. Loaders are commonly used to scoop material from ground level and dump it into a dump truck, hole, trench, bin, or the like. Depending on the intended application, a loader's design, components and specific functionality can vary significantly. However, many components are common to all types of loaders such as, for example, hydraulic booms that are attached to a tilting bucket.

Because front loader assemblies (e.g. booms and bucket) are often required for short operations and at infrequent intervals, such implements are normally detachably attached to a vehicle (i.e., "tractor") so that the boom and bucket (i.e., "loader assembly") can be removed from the tractor and parked. When detached from the tractor, the bucket portion of the loader assembly typically rests on the ground in an upright position. To keep the loader assembly in the upright position, the boom portions of the loader assembly can be configured to include a parking stand.

A parking stand is most often extended and retracted manually. When in the retracted position, the parking stand folds such that it is parallel to the boom and is secured by a lock or lever device. To "park" the loader assembly, the operator typically lowers the booms and tilts the bucket so that the flat portion of the bucket is level with and resting on the ground. The operator exits the cab and walks to the front of the tractor to disengage the parking stands and allow them to swivel and drop down into a rest position on the ground. When retracting the parking stands, the reverse is performed.

To ensure that the loader assembly can later be reattached without significant difficulty, the parking stands should be extended and locked into a precise position where the connectors on the loader assembly will align with the connectors on the tractor. At a minimum, the above steps represent a tedious and time consuming task. However, as can be true with any task requiring manual interaction with heavy equipment in an operational state, the manual process of setting and retracting parking stands exposes the operator to a number of hazards.

SUMMARY

Disclosed herein is a unique parking stand assembly, which provides temporary support for a front loader boom and bucket. The parking stand includes a latch and lock mechanism that is activated when the boom and/or bucket is in a specific position, indicative of a parking procedure. Activation of the latch and lock mechanism unlocks a parking stand when it is in a stowed position, such that it can drop and lock into a position where the parking stand is able to support the weight of the boom.

The present invention comprises a loader assembly having a suspension and support mechanism, which include a boom with a movable implement attached at one end and a parking stand attached to the boom comprising a first strut pivotally attached to a second strut and a locking plate, wherein the locking plate comprises plurality of locking divots for receiving the first strut and second strut.

BRIEF DESCRIPTION OF EXEMPLARY DRAWINGS

A more complete understanding of the present invention may be derived by referring to the detailed description and claims when considered in connection with the Figures, wherein like reference numbers refer to similar elements throughout the Figures, and:

DETAILED DESCRIPTION OF EXEMPLARY EMBODIMENTS

In general, this disclosure presents a unique front-end loader parking stand arrangement, which is of a simple, compact design, which may be easily moved between stowed and parking positions. More specifically, the front-end loader parking stand arrangement includes a pair of support legs, which are each pivotally mounted to a respective boom of the loader assembly. A support leg includes a pair of independently pivoting support struts, which function in a ratchet-like manner relative to a locking mechanism. The locking mechanism comprises a plate having a pair of rows that each include a number of sequential divots. The divots receive the free-end of the respective support strut and secure it unidirectionally, thereby preventing the support legs from collapsing.

When stowed, each parking stand is secured within a respective locking receptacle, which is affixed to each respective loader boom. The locking feature of the receptacle may comprise, for example, a cross pin or cover. Each of a pair of parallel but independently pivoting struts are brought into contact with one of a plurality of divots in the locking mechanism when the support leg is lowered to establish the parking stand park position.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Further embodiments of the invention may include any combination of features from one or more dependent claims, and such features may be incorporated, collectively or separately, into any independent claim.

In describing embodiments herein, directional and positional descriptors (e.g., left, right, front, and back) are based on a perspective of one who is facing the bucket from the position of the boom/tractor connections. As such, for example, the bucket is at the front and the tractor is at the back of the boom assembly.

Figure 1:
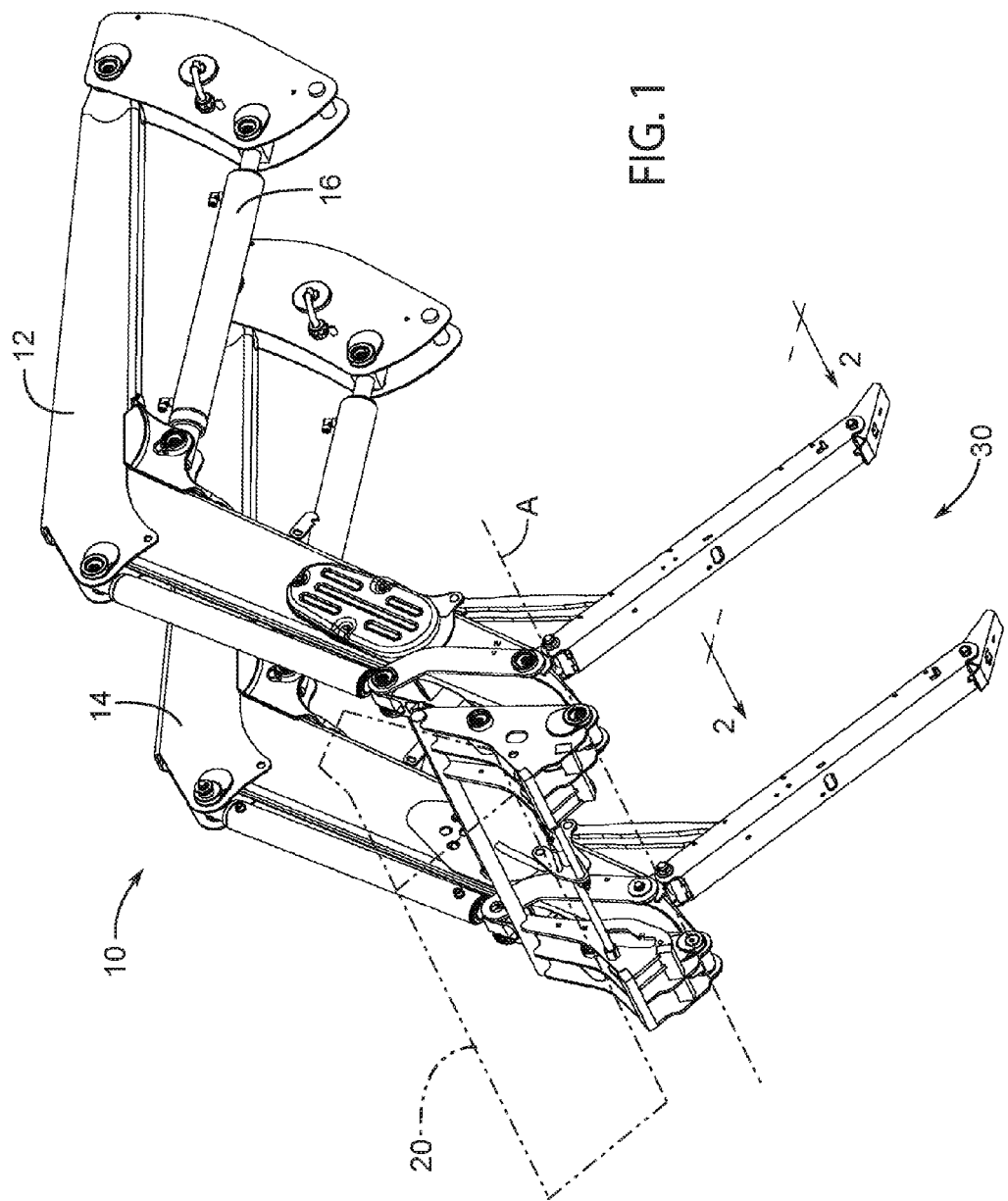
FIG. 1 is a perspective view of a loader boom with a parking stand assembly in an extended position in accordance with one embodiment.

FIG. 1 is a perspective view of a boom with the parking stand assembly in a stowed and locked position in accordance with one embodiment. For simplicity, a loader assembly 10 is illustrated as being detached from the front-end of a tractor. However, those of ordinary skill in the art will appreciate that the described processes for parking and un-parking the loader assembly 10 will most often be performed while the loader assembly 10 is pivotally attached to the tractor. For example, a front-end of a tractor may include a first coupling pin positioned and affixed to a first side of the tractor frame and a second coupling pin positioned and affixed to a second opposing side of the tractor frame, the first and second coupling pins pivotally securing a first boom 12 and a second boom 14 of the loader assembly 10 to the tractor frame.

In one embodiment, the loader booms 12, 14 are pivoted about tractor frame coupling pins by a first pair of hydraulic actuators 16 that are respectively coupled between each tractor frame coupling pin and the associated boom 12, 14. A second pair of hydraulic actuators may be implemented to control the disposition of a bucket 20 or other moveable implement about its pivotal connections at a forward end of each boom 12, 14. In one embodiment, the bucket 20 is removable, such that it may be detached from the loader assembly 10 and interchanged with other implements. In a typical configuration, a loader assembly will include a parking stand assembly that is positioned on each of two parallel booms. Elements of the parking stand assembly and the associated booms may be referenced in the singular throughout this disclosure. However, the description of the parking stand assembly and interconnected loader assembly components will at least equally apply to a second parking stand assembly that is positioned on and attached to a second boom. For simplicity, only one parking stand assembly is described.

In one embodiment, a parking stand assembly 30 is pivotally connected to the boom 12. Front-loader assemblies typically fall into one of two common boom configurations. In a first configuration, a single boom pivots at an end where it connects to the tractor and pivots at the opposing end to control the tilt of an attached implement. In a second configuration, the boom includes an additional pivot point that is positioned at a point between the tractor end and the bucket 20. For simplicity, a single boom will be described with reference to the disclosed parking stand assembly 30. However, those of ordinary skill in the art will appreciate that the parking stand assembly 30 may be applied to any or all of various boom configurations. Moreover, the parking stand assembly 30 may be positioned at any point along the length of a boom and/or boom segment.

Figure 2:
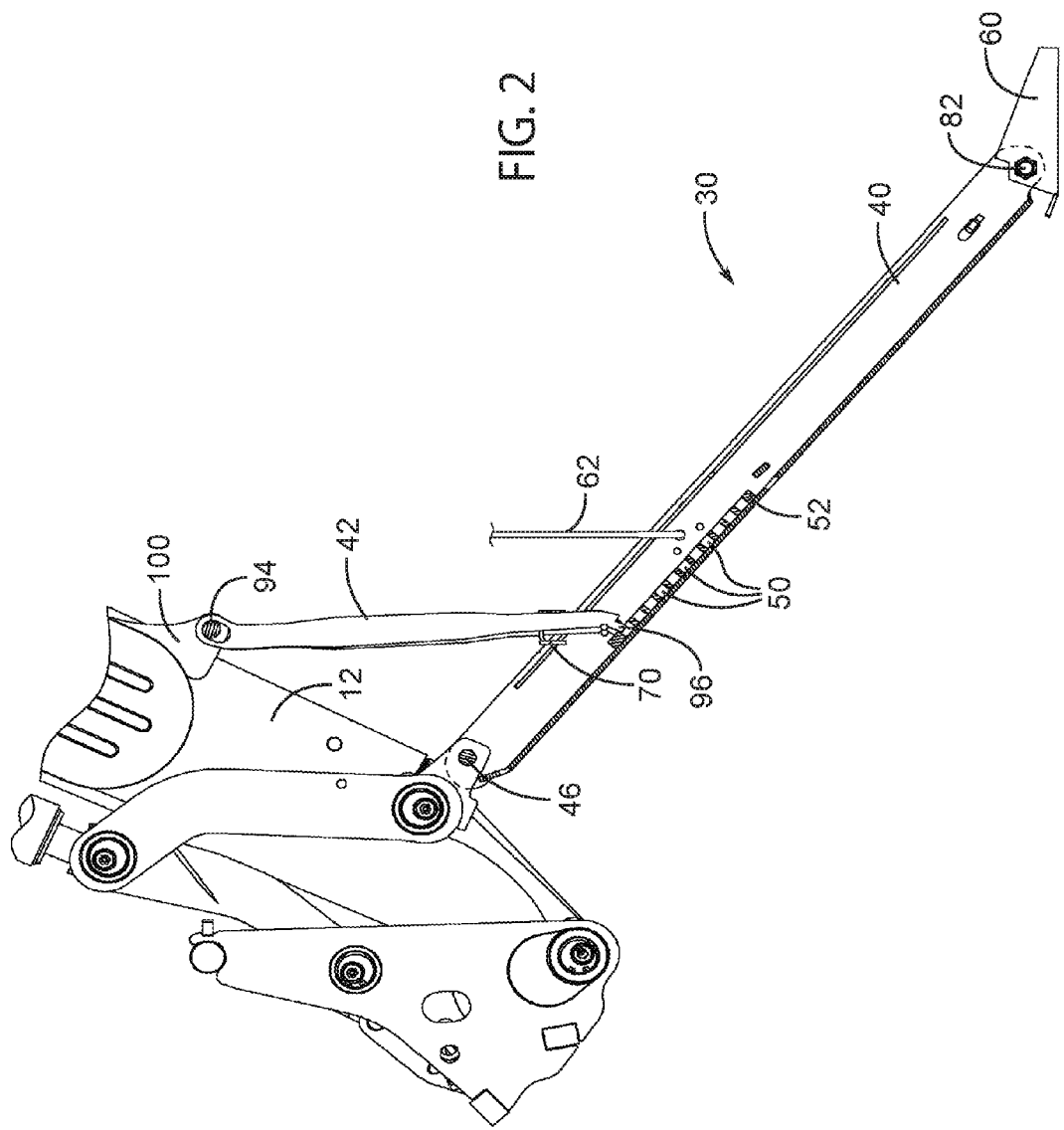
FIG. 2 is a side view thereof showing various components of the parking stand assembly in section as taken along line 2-2 of FIG. 1.

FIG. 2 is a perspective view of the parking stand assembly 30 pivotally connected to the loader booms 12, 14 in accordance with one embodiment. As shown, the parking stand assembly 30 includes a support leg 40 and a strut assembly 42, which are each connected to one of the loader booms 12, 14. In one embodiment, the support leg 40 includes at a first end, a through hole, which engages a boom attached coupling pin 46. The through hole and coupling pin attachment 46 allows the support leg 40 to move about a single axis (e.g., front to back).

At a strut end opposite the boom engaging end, the strut assembly 42 includes a portion that is sized and comprises a shape that may be suitably received by or retrained by one of a series of divots or grooves 50 on a locking mechanism 52. As will be described in greater detail herein, the divots or grooves 50 may be machined or molded along the strut facing side of the support leg 40. In one embodiment, the locking mechanism 52 takes the form of a locking plate that is fixed to the support leg 40 by way of, for example, welds, bolts, pins, or rivets.

In one embodiment, the support leg 40 includes a ground-engaging foot 60, which is pivotally attached to an end opposing the boom engaging end of the support leg 40. To provide greater support on a ground surfaces of variable grades, the foot 60 is attached to the support leg 40 to allow limited movement along a single axis.

Figure 3:
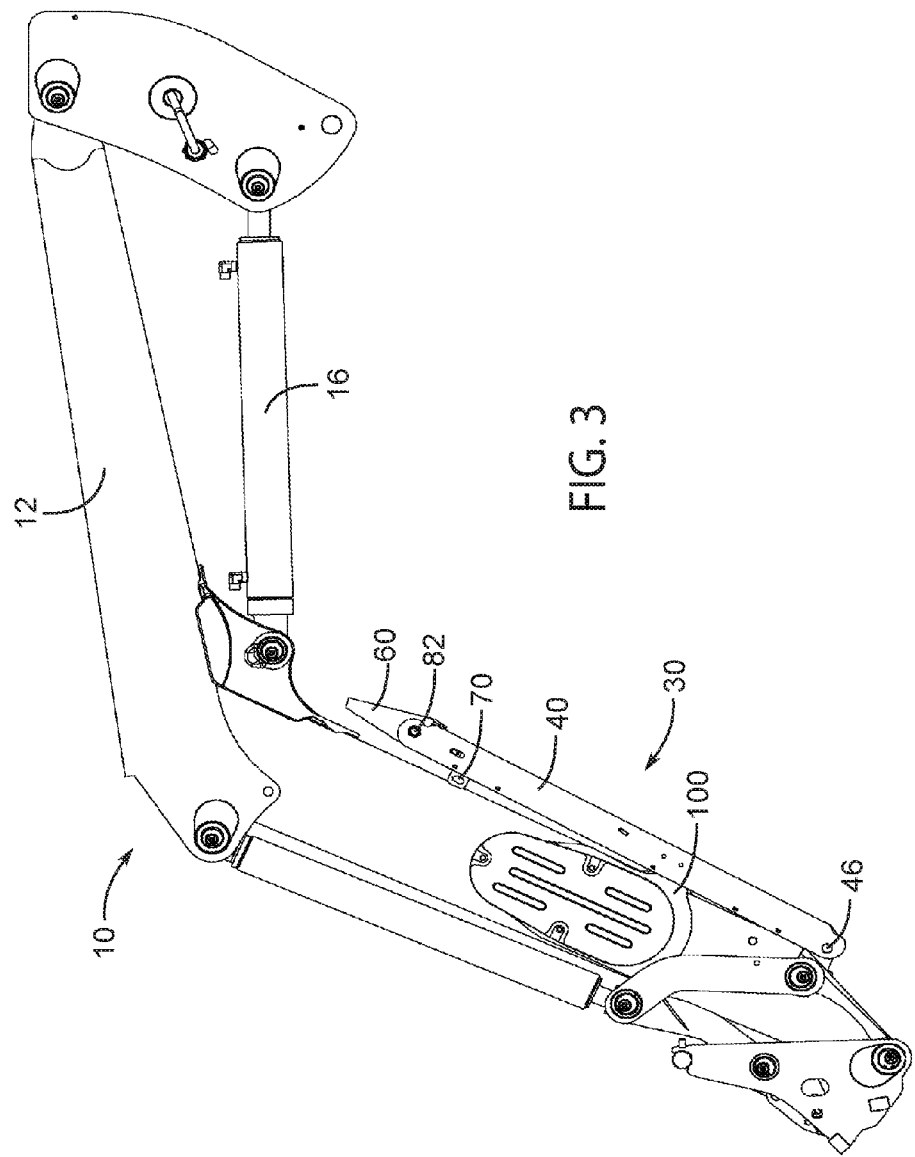
FIG. 3 is a side view thereof with the parking stand assembly in a stowed position.

FIG. 3 shows the parking stand assembly 30 with the support leg 40 and strut assembly 42 in a stowed position. In the stowed position of the parking stand assembly 30, the support leg 40 is pivoted and latched against the boom 12 so as not to interfere with the operation of the loader assembly 10. A latching mechanism 70 secures the support leg 40 while stowed and may comprise a pivoting hook that is held into a default latched position by a spring or similar. In one embodiment, the latching mechanism 70 may be operated by linkages or cable controls. Alternatively, the latching mechanism 70 may be actuated electrically, hydraulically, or pneumatically using power sources made available by the tractor. Further, a means for activating the latching mechanism 70 may include an electromagnet. For example, through the use of an electromagnet, a latch pin or lock may be controlled, with the pin being spring biased to a position such that when the electromagnet is de-energized, even by a power failure, the support leg 40 would remain latched in the stowed position.

When the latching mechanism 70 is released, the support leg 40 pivots down due to the force of gravity. In one embodiment, the support leg 40 may be driven down toward a parking position by a motor, spring, or actuator. Movement of the strut assembly 42 is provided by any means disclosed herein, thereby causing movement of the support leg 40 to correspond to the guided movement of the strut assembly 42. In order to return the support leg 40 to a position in which it is pivoted upward in the stowed position, the strut assembly 42 may be manually or automatically pivoted upward toward the boom 12, where it is secured by the latching mechanism 70.

In one embodiment, powered movement to either of the support leg 40 or the strut assembly 42 is provided by hydraulic driven movements of boom components. For example, in order to park the loader assembly 10, an operator uses tractor controllers to invoke movement of the boom 12 and the bucket 20. By raising or lowering the boom 12 and tilting the bucket 20 about its horizontal axis A into a specific position, attached cabling 62 may translate the hydraulic driven movements into mechanical movements of parking stand components. These movements may be applied to open or close the latching mechanism 70, lower or retract the support leg 40, or pivot the strut assembly 42.

Figure 4:
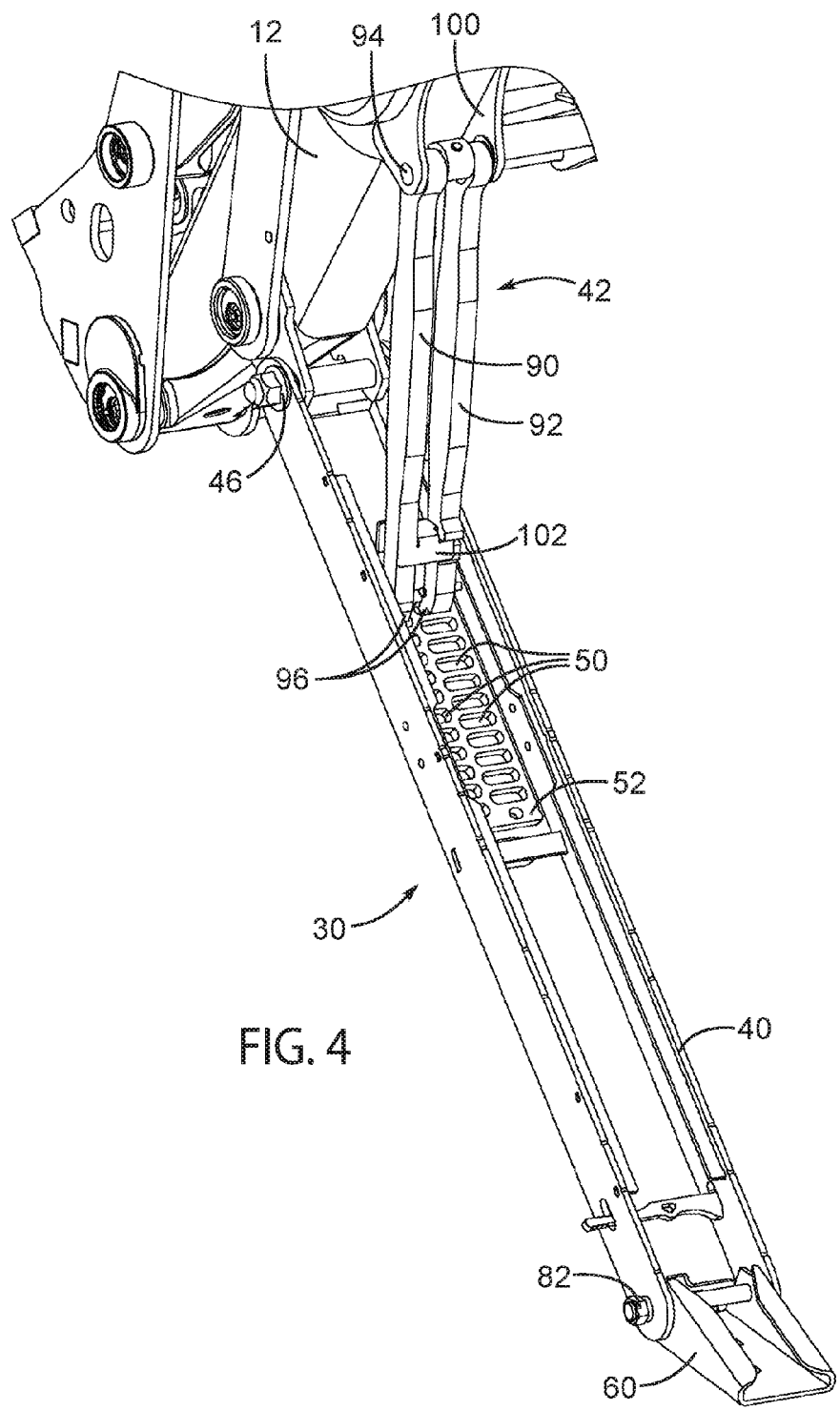
FIG. 4 is a partial perspective view showing a support leg component of the parking stand assembly including a ratchet-type mechanism for locking the support leg in an extended position in accordance with one embodiment.

FIG. 4 is a perspective view of the support leg 40 of the parking stand assembly 30 including the ratchet-type locking mechanism 52 for locking the support leg 40 in an extended position in accordance with one embodiment. The support leg 40 is presented in FIG. 4 with respect to the interconnections with the boom 12 and strut assembly 42 while in a parking position. When the parking stand assembly 30 is released and lowered from its stowed position, downward motion is stopped when the foot 60 contacts the ground surface. At the ground-engaging end of the support leg 40, the foot 60 is pivotally attached to the support leg 40 by means of a coupling pin 82, in accordance with one embodiment.

To provide vertical reinforcement to the support leg 40 and to lock the support leg 40 into a precise ground-engaging position, the strut assembly 42 of the parking stand assembly 30 includes two strut parts 90, 92. In accordance with this embodiment, the strut parts 90, 92 may be separately pivotally attached to the loader boom 12 by way of a through hole and coupling pin arrangement 94, such that each strut part 90, 92 is able to pivot independently.

Each of the strut parts 90, 92 includes a locking element (e.g., divot or groove) engaging portion 96 at the end opposite the end pivotally connected by the through hole and coupling pin arrangement 94. The size and shape of the engaging portion 96 may vary based on the size and shape of the divots or grooves 50. In an alternate embodiment, the parking stand assembly may include a strut with a single strut part, which is pivotally attached to the boom and engages a single row of sequentially positioned divots or grooves.

As shown, each of the two strut parts 90, 92 are pivotally attached by way of the through hole and coupling pin arrangement 94, which secures the strut parts 90, 92 to a mounting bracket 100 that is attached to the boom 12. In accordance with this embodiment, the two strut parts 90, 92 may be configured to pivot in unison when moving in a single direction. Accordingly, the first strut part 90 includes a limiter 102 in the form of a stopper attached thereto to prevent the second strut part 90 from pivoting ahead of the first strut part 90 while moving in single direction.

Alternatively, the two pivotally attached strut parts 90, 92 may be bound together in a manner that causes them to pivot in unison. Thus, the limiter may be a bracket that functions to bind the strut parts 90, 92 and may be configured in a manner that creates a slight angular offset, wherein the second strut part 92 is held in a position that is slightly ahead of the first strut part 90. Two columns of divots or grooves 50 for securing the engaging end of each strut part 90, 92 are similarly offset (such that adjacent divots or grooves in the columns do not align in a row) to allow for a greater density of divots or grooves 50 allowing for greater precision in strut positioning. Having a greater number of divots or grooves 50 in close proximity contributes to the increased positioning precision without significantly impacting the tensile strength of the locking plate 52.

When the first strut part 90 engages one of the divots or grooves 50 in the first column, the second offset strut part 92 engages a divot or groove 50 in the slightly offset second column. Because the two strut parts 90, 92 engage two slightly offset divots or grooves 50, the locking plate 52 is not overly weakened by having two horizontally aligned divots or grooves 50 in very close proximity, which forms a straight line of significantly removed material. Those of ordinary skill in the art will appreciate that having a series of cutouts positioned along a shared axis of a metal plate will result in a logical breaking point when subjected to excessive weight.

In one embodiment, the support leg 40 comprises a length of C-shaped metal (i.e., c-beam), where the open side of the "C" faces the boom 12 and the strut parts 90, 92. The locking plate 52 is attached to the support leg 40 and likewise faces the boom 12 and the strut parts 90, 92, such that the divot engaging ends of the strut parts 90, 92 are able to engage the locking plate divots or grooves 50. Positioning the locking plate 52 within the channel of the c-beam shaped support leg 40 further secures the locking plate 52 by preventing side-to-side movement.

The locking plate 52 comprises a high-strength material and includes, in one embodiment, two parallel lines of sequential divots, or grooves 50. A divot or groove 50 may comprise a hole that is bored through the locking plate 52, where the depth of the divot or groove 50 equals the thickness of the locking plate 52. In the illustrated embodiment, each divot or groove 50 is pill shaped, wherein the long side of the divot or groove 50 is perpendicular to the length of the support leg 40. However, the divots or grooves 50 may comprise any shape and may take the form of a through hole or an inset, which does not pass through the locking plate 52. In one embodiment, narrow strips of a hardened material (e.g., steel) may be formed into a grid-like structure, which is attached to the top of the locking plate. In accordance with this embodiment, the strut end portions are secured between a series of grid lines.

In one embodiment, the locking plate 52 is permanently or semi-permanently secured to the support leg 40 by way of bolts, rivets, or welds. The locking plate 52 is of a sufficient width to fit within the support leg channel and is of a sufficient length to engage the strut parts 90, 92 when the support leg 40 is pivoting into or out of a locked position.

In another embodiment, the locking plate may slide along a track within the support leg channel. In addition to an ability to move along a track, either the locking plate, the support leg, or a combination thereof, includes a mechanical means for securing the locking plate into a position along the track. The strut parts may remain engaged with the locking plate as the support leg pivots between a fully extended position and a stowed position, such that the locking plate moves along the length of the support leg in response to movement of the support leg. In the previously disclosed embodiment, having the secured locking plate rather than having the strut parts ratchet over a secured locking plate.

Those of ordinary skill in the art will appreciate that there are a variety of methods and mechanisms that would effectively secure the locking plate into a desired position and release the locking plate to allow full or limited movement. In various embodiments, the disclosed parking stand assembly may utilize automatic means, manual means, or a combination of means to secure and release the locking plate. Those of ordinary skill in the art will appreciate that whether the securing means comprises a cable and lever arrangement or a sensor and solenoid actuator, the elected method for securing does not alter, nor does it limit the scope of the invention.

Moreover, relative to the mechanical components for carrying out the features of the disclosed parking stand, various known methods, mechanisms, and systems exist, for example, to determine and measure movement, facilitate movement and secure components to prevent movement. The disclosed parking stand may incorporate any known method for carrying out the various mechanical features disclosed herein, without departing from the scope of the invention.

In the foregoing specification, the system has been described with reference to specific embodiments. However, it may be appreciated that various modifications and changes may be made without departing from the scope of the invention. The specification and figures are to be regarded in an illustrative manner, rather than a restrictive one, and all such modifications are intended to be included within the scope of invention. Accordingly, the scope of the invention should be determined by the appended claims and their legal equivalents, rather than by the examples given above. For example, the steps recited in any of the method or process claims may be executed in any order and are not limited to the order presented.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

What is claimed is:

1. A parking stand assembly for a loader boom to which is mounted a movable attachment, the parking state assembly comprising:
   a support leg coupled to the loader boom at a first pin connection to be pivotal between extended and retracted positions;
   a strut assembly coupled to the loader boom at a second pin connection, the strut assembly having a first strut part and a second strut part, the first and second struts parts each being separately pivotally coupled to the second pin connection and each having an engagement end; and
   a locking mechanism mounted to the support leg and receiving the engagement ends of the first and second strut parts;
   wherein when the engagement ends of the first and second strut parts are engaged with the locking mechanism the support leg is held by the strut assembly in the extended position so as to support the loader boom.

2. The loader boom parking stand assembly of claim 1, wherein the engagement ends of the first and second strut parts are independently engagable with the locking mechanism.

3. The loader boom parking stand assembly of claim 1, wherein the locking mechanism is a locking plate having a plurality of divots; and
   wherein the engagement ends of the first and second strut parts are configured to fit, at least in part, within the plurality of divots.

4. The loader boom parking stand assembly of claim 3, wherein the divots are aligned in the locking plate in columns arranged side by side.

5. The loader boom parking stand assembly of claim 4, wherein the divots of one column are offset from the divots of an adjacent column so as not to align side by side.

6. The loader boom parking stand assembly of claim 1, wherein the first strut part includes a limiter that prevents the second strut part from pivoting ahead of the first strut part while moving in a single direction.

7. The load boom parking stand assembly of claim 1, wherein the first strut part includes a limiter that causes the first and second strut parts to pivot in unison.

8. The loader boom assembly parking stand of claim 7, wherein the limiter maintains an angular offset between the first and second strut parts.

9. The loader boom parking stand assembly of claim 1, further including an actuator configured to move the support leg from the extended position to the retracted position.

10. The loader boom parking stand assembly of claim 9, wherein the actuator includes a cable coupling the support leg to the movable implement.

11. The loader boom parking stand assembly of claim 1, further including a latch configured to secure to the loader boom to latch the support leg in the retracted position.

* * * * *